(12) United States Patent
Fu et al.

(10) Patent No.: US 10,038,554 B2
(45) Date of Patent: Jul. 31, 2018

(54) METHOD, APPARATUS, AND SYSTEM FOR IDENTITY AUTHENTICATION

(71) Applicant: ALIBABA GROUP HOLDING LIMITED, George Town, Grand Cayman (KY)

(72) Inventors: Yingfang Fu, Beijing (CN); Shuanlin Liu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 31 days.

(21) Appl. No.: 15/017,416

(22) Filed: Feb. 5, 2016

(65) Prior Publication Data

US 2016/0241396 A1 Aug. 18, 2016

(30) Foreign Application Priority Data

Feb. 16, 2015 (CN) .......................... 2015 1 0084941

(51) Int. Cl.
*H04K 1/00* (2006.01)
*H04L 9/00* (2006.01)
(Continued)

(52) U.S. Cl.
CPC .......... *H04L 9/0858* (2013.01); *H04L 9/0836* (2013.01); *H04L 9/0852* (2013.01);
(Continued)

(58) Field of Classification Search
CPC ....... H04L 9/08; H04L 9/0836; H04L 9/0852; H04L 9/0858; H04L 9/0883;
(Continued)

(56) References Cited

U.S. PATENT DOCUMENTS 5,515,438 A * 5/1996 Bennett ................. H04L 9/0858
380/256
7,248,695 B1 7/2007 Beal et al.
(Continued)

OTHER PUBLICATIONS

PCT International Search Report and Written Opinion dated May 16, 2016, issued in corresponding International Application No. PCT/US16/16740 (11 pages).
(Continued)

*Primary Examiner* — Jayesh M Jhaveri
(74) *Attorney, Agent, or Firm* — Finnegan, Henderson, Farabow, Garrett & Dunner LLP

(57) ABSTRACT

An identity authentication method for a quantum key distribution process includes selecting, by a sender, preparation bases of an identity authentication bit string in accordance with a preset basis vector selection rule; sending, by a sender, quantum states of the identity authentication bit string and quantum states of a randomly generated key bit string by using different wavelengths. The identity authentication bit string is interleaved in the key bit string at a random position and with a random length. The method further includes measuring, by a receiver, the received quantum states in the quantum state information in accordance with the different wavelengths and measurement bases selected according to the preset basis vector selection rule to obtain identity authentication information from the measurement of the identity authentication bit string; and determining, by the receiver, whether the identity authentication information obtained through the measurement corresponds with the preset basis vector selection rule.

43 Claims, 8 Drawing Sheets

(51) Int. Cl.
*H04L 9/28* (2006.01)
*H04L 9/08* (2006.01)
*G06F 21/44* (2013.01)
*H04L 29/06* (2006.01)
*G06F 21/31* (2013.01)

(52) U.S. Cl.
CPC .............. *G06F 21/31* (2013.01); *G06F 21/44* (2013.01); *H04L 9/08* (2013.01); *H04L 9/088* (2013.01); *H04L 9/0844* (2013.01); *H04L 9/0855* (2013.01); *H04L 63/062* (2013.01); *H04L 63/064* (2013.01); *H04L 63/18* (2013.01); *H04L 2209/24* (2013.01)

(58) Field of Classification Search
CPC ......... H04L 2209/24; H04L 9/00; H04L 9/28; H04L 9/0844; H04L 9/0855; H04L 9/088; H04L 63/062; H04L 63/064; H04L 63/18; G06F 21/31; G06F 21/44; H04K 1/00
See application file for complete search history.

(56) References Cited

U.S. PATENT DOCUMENTS

| | | | | |
|---|---|---|---|---|
| 7,359,512 B1* | 4/2008 | Elliott | ................... | H04L 9/0858 380/253 |
| 7,864,958 B2 | 1/2011 | Harrison et al. | | |
| 8,488,790 B2 | 7/2013 | Wellbrock et al. | | |
| 8,639,927 B2* | 1/2014 | Choi | ..................... | H04L 9/0852 713/168 |
| 2005/0078826 A1 | 4/2005 | Takeuchi | | |
| 2005/0259825 A1 | 11/2005 | Trifonov | | |
| 2007/0036353 A1* | 2/2007 | Reznik | ................. | H04B 7/0434 380/30 |
| 2007/0076884 A1 | 4/2007 | Wellbrock et al. | | |
| 2008/0101612 A1 | 5/2008 | Imai et al. | | |
| 2009/0106551 A1 | 4/2009 | Boren et al. | | |
| 2009/0175452 A1 | 7/2009 | Gelfond et al. | | |
| 2010/0226659 A1 | 9/2010 | Nishioka et al. | | |
| 2010/0260161 A1 | 10/2010 | Van Veen et al. | | |
| 2011/0126011 A1 | 5/2011 | Choi et al. | | |
| 2011/0213979 A1 | 9/2011 | Wiseman et al. | | |
| 2011/0317836 A1 | 12/2011 | Yeh et al. | | |
| 2012/0082312 A1 | 4/2012 | Liu et al. | | |
| 2012/0177201 A1* | 7/2012 | Ayling | .................. | H04L 9/0858 380/278 |
| 2013/0058485 A1 | 3/2013 | Xin et al. | | |
| 2013/0068186 A1 | 3/2013 | Gabrielsson | | |
| 2013/0083926 A1* | 4/2013 | Hughes | ................. | H04L 9/0836 380/278 |
| 2013/0101121 A1* | 4/2013 | Nordholt | ............... | H04L 9/0852 380/279 |
| 2013/0315395 A1 | 11/2013 | Jacobs | | |
| 2015/0195087 A1* | 7/2015 | Doi | ...................... | G06N 99/002 380/278 |
| 2015/0222619 A1* | 8/2015 | Hughes | ................... | H04L 63/08 713/168 |
| 2016/0248586 A1* | 8/2016 | Hughes | ................. | H04L 9/0852 |

OTHER PUBLICATIONS

Communication from the European Patent Office enclosing the Extended European Search Report including, pursuant to Rule 62 EPC, the supplementary European search report (Art. 153(7) EPC) and the European search opinion for Application No. 16752796.9-1218, dated Feb. 27, 2018, 8 pgs.

Olli Ahonen et al. "Entanglement-Enhanced Quantum Key Distribution" arxiv.org, Cornell University Library, 201 Olin Library Cornell University, Ithaca, NY 14853, XP080343917, Dec. 27, 2007, 7 pgs.

Valerio Scarani et al "The Security of Practical Quantum Key Distribution" arxiv.org, Cornell University Library, 201 Olin Library Cornell University, Ithaca, NY 14853, XP080402341, Feb. 28, 2008, 52 pgs.

Yu Liu et al. "A Discussion on a Quantum Key Remote Distribution Scheme Not Based on the Quantum Entanglement State", SPIE, P.O. Box 10, Bellingham, WA, 98227-0010, XP040253902, 2003.

* cited by examiner

METHOD, APPARATUS, AND SYSTEM FOR IDENTITY AUTHENTICATION

CROSS REFERENCE TO RELATED APPLICATION

The present application claims the benefits of priority to Chinese Patent Application No. 201510084941.2, filed Feb. 16, 2015, the entire contents of which are incorporated herein by reference.

TECHNICAL FIELD

The present application relates to methods, apparatus, and systems for identity authentication.

BACKGROUND

Quantum cryptography technology serves as a cross product of quantum mechanics and cryptography, its security is supported by the basic principle of the quantum mechanics, not affected by computing power and storage capacity of attackers, and therefore, is proven to have unconditional security and detectability for eavesdroppers. Although initially proposed quantum key distribution protocols (such as BB84) can detect the eavesdroppers' operation of stealing keys, the protocols do not provide any effective identity authentication mechanism.

Identity authentication is an important link for network security. Authenticity of both communication parties, integrity of messages and reliability of sources can be verified by authentication, so as to prevent an illegal party from attacking information communication such as forging and modifying information and delaying the communication. As traditional quantum key distribution protocols do not have any effective identity authentication mechanism, it is likely that the protocols are subject to middle-man attacks or Distributed Denial of Service (DDoS) attacks in a quantum key distribution process.

With respect to the foregoing problems:

(i) M. Dusek et al. believe that it is not necessary to authenticate all classic information in a communication process, it is only necessary to authenticate classic information that affects correct judgment of error rates of quantum states but not necessary to authenticate other classic information, and security will not be affected even if the classic information is modified. Therefore, M. Dusek puts forward a quantum identity authentication protocol that combines with a classic message authentication algorithm, and the essence is authenticating classic messages as few as possible with the classic authentication algorithm.

(ii) A BB84 protocol with identity authentication is used. A main difference between the protocol and the original BB84 protocol is that some bits in a quantum bit string randomly sent are set as particular authentication key bits, for example, one in every four bits in the quantum bit string being the particular authentication key bit, and its specific position is determined by an authentication key. Identity authentication of both communication parties is achieved through a measurement basis vector represented by bits of the authentication bit and a polarization state of light quantum, quantum state information of the authentication bit cannot be sent randomly but should be determined by authentication keys shared by both parties in accordance with a particular rule, and at the same time, the basic principle of the quantum mechanics is responsible for secure key distribution.

The above two proposals have the following issues:

(i) Regarding the M. Dusek solution, the number of the authentication keys shared by both communication parties in advance is limited, and thus the solution is vulnerable to middle-man attacks and DDOS attacks; moreover, the solution does not make full use of superiority of quantum but still uses a classic authentication technology, so there is a risk of being cracked.

(ii) Although the BB84 protocol with identity authentication sends shared authentication key information in a form of quantum states, which improves security of key distribution, as, in the technical solution, it is assumed that all quantum states of an authentication key of a transmitting end can be transmitted to a receiving end, the receiving end can select corresponding measurement bases for detection in accordance with a preset authentication key. If detection results are consistent, the technical solution is passed, and otherwise, the other party is considered to be illegal, and the quantum key distribution process is terminated. The solution does not take attenuation of photons in an actual transmission process into account (that is, the photons may not be necessarily transmitted to the other party, and consistency of the quantum states cannot be ensured naturally), that is to say, the technical solution does not provide fault tolerance for channel attenuation, resulting in reduction of an identity recognition rate and the quantity of quantum key distribution.

SUMMARY

One aspect of the present disclosure is directed to an identity authentication method for a quantum key distribution process and can be implemented by quantum communication devices of a sender and a receiver. The method includes selecting, by the sender, preparation bases for an identity authentication bit string in accordance with a preset basis vector selection rule; sending, by the sender, quantum state information including quantum states of the identity authentication bit string and quantum states of a randomly generated key bit string by using different wavelengths, the identity authentication bit string being interleaved in the key bit string at a random position and with a random length; measuring, by the receiver, the received quantum states in the quantum state information in accordance with the different wavelengths and measurement bases selected according to the preset basis vector selection rule to obtain identity authentication information from the measurement of the identity authentication bit string; and determining, by the receiver, whether the identity authentication information obtained through the measurement corresponds with the preset basis vector selection rule. If a result of the determination is "yes," the method further comprises selecting, by the receiver, a receiver authentication key from the identity authentication information; sending, by the receiver, position information of the receiver authentication key in the identity authentication information obtained through the measurement and a preset shared key encrypted with the receiver authentication key; selecting, by the sender, a corresponding sender authentication key in accordance with the received position information and the identity authentication bit string; determining, by the sender, whether the preset shared key obtained by decryption with the corresponding sender authentication key is consistent with a local preset shared key; and ending the quantum key distribution process if the preset shared key obtained by decryption is not consistent with the local preset shared key.

Another aspect of the present disclosure is directed to an identity authentication method for a quantum key distribution process, implemented by a quantum communication sender device. The method includes sending quantum state information including quantum states of an identity authentication bit string and quantum states of a randomly generated key bit string by using preset different wavelengths to a peer device which participates in the quantum key distribution process, the identity authentication bit string being interleaved in the key bit string at a random position. The identity authentication bit string may have a random length. According to another embodiment of the present disclosure, the identity authentication method may further include selecting preparation bases for the identity authentication bit string in accordance with a preset basis vector selection rule. The preset basis vector selection rule may include selecting bases in accordance with positions of the identity authentication bits in the quantum state information (e.g., selecting a basis in accordance with a position of a bit). The selecting the preparation bases in accordance with the positions of the identity authentication bits in the quantum state information may include selecting a horizontal polarization basis, vertical polarization basis, left-handed polarization basis, or right-handed polarization basis in accordance with different results of position information of each identity authentication bit in the quantum state information mod 4.

According to some embodiments, the identity authentication method described above may further include receiving authentication key position information from the peer device, and selecting an authentication key from the quantum states in the quantum state information in accordance with the authentication key position information. According to some other embodiments, the method may further include receiving encrypted information including a preset shared key from the peer device, decrypting the received encrypted information with the authentication key, determining whether the decrypted preset shared key is consistent with a local preset shared key, and ending the quantum key distribution process if the decrypted preset shared key is not consistent with the local preset shared key. According to yet some other embodiments, the identity authentication method may further include, before sending the quantum state information of the identity authentication bit string and of the randomly generated key bit string, receiving account information from the peer device, and verifying an identity of the peer device according to the received account information, and if the verification fails, ending the quantum key distribution process.

A further aspect of the present disclosure is directed to an identity authentication device for a quantum key distribution process, implemented on a quantum communication sender device. The identity authentication device includes a quantum state sending unit configured to select preparation bases for an identity authentication bit string in accordance with a preset basis vector selection rule, and to send quantum state information including quantum states of the identity authentication bit string and quantum states of a randomly generated key bit string by using preset different wavelengths to a peer device which participates in the quantum key distribution process, the identity authentication bit string being interleaved in the key bit string at a random position. The identity authentication bit string may have a random length. The preset basis vector selection rule may include selecting preparation bases in accordance with positions of identity authentication bits in the quantum state information. According to some embodiments, selecting the corresponding preparation bases in accordance with the positions of the identity authentication bits in the quantum state information may include selecting a corresponding horizontal polarization basis, a corresponding vertical polarization basis, a corresponding left-handed polarization basis, or a corresponding right-handed polarization basis in accordance with different results of position information of each identity authentication bit in the quantum state information mod 4. According to some embodiments, the identity authentication device may further include an information receiving unit configured to receive authentication key position information from the peer device, and an information decryption unit configured to select an authentication key in accordance with the position information and that quantum state information.

Another further aspect of the present disclosure is directed to an identity authentication method for a quantum key distribution process, implemented by a quantum communication receiver device. The method includes receiving quantum state information including quantum states of an identity authentication bit string interleaved within a key bit string from a peer device, the identity authentication and the key bit strings having different wavelengths; distinguishing the identity authentication bit string from the key bit string based on the different wavelengths; measuring the received quantum states using measurement bases in accordance with a preset basis vector selection rule to obtain identity authentication information through the measurement; and determining if the obtained identify authentication information corresponds with the preset basis vector selection rule. The identity authentication bit string may be interleaved within the key bit string at a random position. The identity authentication bit string may have a random length. The preset basis vector selection rule may include selecting bases in accordance with positions of identity authentication bits in the quantum state information. The selecting the bases in accordance with the positions of the identity authentication bits in the quantum state information may include selecting a corresponding horizontal polarization basis, vertical polarization basis, left-handed polarization basis, or right-handed polarization basis in accordance with different results of position information of each identity authentication bit in the quantum state information mod 4.

Another aspect of the present disclosure is directed to an identity authentication device for a quantum key distribution process, implemented on a quantum communication receiver device. The identity authentication device includes a quantum state receiving unit configured to receive quantum state information including quantum states of an identity authentication bit string interleaved within a key bit string from a peer device. The identity authentication and the key bit strings have different wavelengths. The identity authentication device may further include a quantum state measuring unit configured to measure the received quantum states in accordance with the different wavelengths and a preset basis vector selection rule to obtain identity authentication information through the measurement. The identity authentication device may further include a receiver authentication unit configured to determine if the obtained identify authentication information corresponds with the preset basis vector selection rule.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
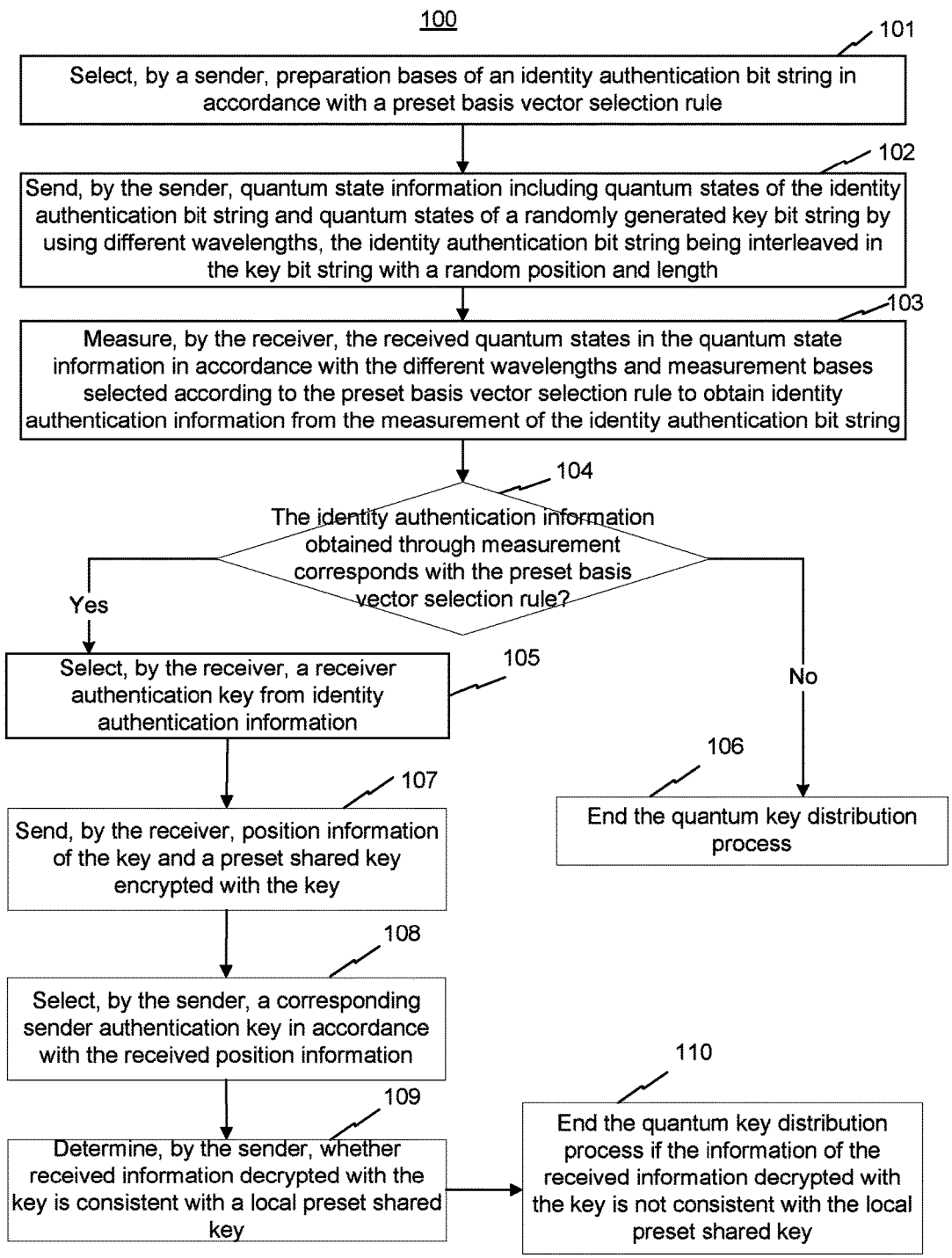
FIG. 1 is a flow diagram illustrating an identity authentication method, according to an exemplary embodiment.

FIG. 1 is a flow diagram illustrating an identity authentication method 100, according to an exemplary embodiment. The method is implemented by quantum communication devices of a sender and a receiver which participate in a quantum key distribution process. The quantum key distribution process can also be referred to as a quantum key agreement process. The method includes a number of steps, some of which are optional.

In some embodiments, identities of the quantum communication devices of both parties which participate in the distribution process are verified dynamically in the quantum key distribution process. A device that selects preparation bases to send quantum state information to a peer device is generally referred to as Alice (A) side, which is called a quantum communication sender device, and called a sender for short; a device that selects measurement bases to measure received quantum state information is generally referred to as Bob (B) side, which is called a quantum communication receiver device, and called a receiver for short. The sender and the receiver may each include a processor and a non-transitory memory storing instructions that, when executed, control the processor to perform steps described below.

According to some embodiments of the present disclosure, the identity authentication method for a quantum key distribution process (also referred to as a quantum key agreement process) includes the following steps:

Step 101: The sender selects preparation bases of an identity authentication bit string in accordance with a preset basis vector selection rule.

Step 102: The sender sends quantum state information including quantum states of an identity authentication bit string and quantum states of a randomly generated key bit string by using different wavelengths, the identity authentication bit string being interleaved in the key bit string with random positions and lengths. The quantum state information includes the state of each bit in the identity authentication bit and the key bit string.

In some embodiments, identity authentication can be dynamically performed in the quantum key distribution process. At the same time, in order to avoid that the quantum key distribution process is executed between illegal quantum communication devices, in one embodiment: before the sender starts the quantum key distribution process, the quantum communication devices of the sender and the receiver can first verify the identity of the device of the other party via a classic channel, and the subsequent quantum key distribution process can be continued only when the devices of the both parties both pass the verification.

In some embodiments, an initiator of the quantum key agreement process, that is, the sender described in the present application, can initiate a quantum key agreement request at first, in which the request includes account information of the sender, and the account information may include identity information and a signature certificate of the sender. After a peer device that participates in the quantum key agreement process, that is, the receiver described in the present application, receives the aforementioned account information, the receiver verifies the signature certificate by using the identity information therein. If the signature certificate passes the verification, response information is returned to the sender, which includes account information of the receiver, and if the certificate does not pass the verification, the quantum key agreement process is ended.

For the same reason, after receiving the account information from the receiver, the sender can verify the identity of the receiver in the same manner as described above. If the identity of the receiver passes the verification, the subsequent quantum key distribution process can be executed, and otherwise, the quantum key distribution process is ended.

If both the sender and the receiver pass the above identity verification process, the subsequent quantum key distribution process is continued. The sender selects preparation bases according to a basis vector selection rule and uses the selected preparation bases to prepare the identity authentication quantum states. In some embodiments, in order to dynamically perform identity verification in the quantum key distribution process, the sender and the receiver may preset the same shared key. The sender interleaves an identity authentication bit string with a random length at any position of a key bit string and uses preset different wavelengths to distinguish quantum states of the above two kinds of information (which are called key quantum state and identity authentication quantum state for short). The key bit string can be the same shared key or a different key.

For example, the sender intends to send the quantum state information including the quantum states of a binary bit string with a length of n at time points $t_1, t_2 \ldots t_n$, the binary bit string includes two parts, one part being a classic binary bit string randomly generated, which serves as a key bit string, and the other part being an identity authentication bit string associated with a preset basis vector selection rule. The sender can select a random number m less than n in accordance with a certain policy to serve as the length of the identity authentication bit string, and then randomly select a natural number i from natural numbers of 1 to n−m to serve as the length of the key bit string located before the identity authentication bit string, that is, the identity authentication bit string begins to be inserted from a position i+1, so as to obtain a binary bit string as shown below. In the bit string, $x_{i+1} \ldots x_{i+m}$ is an identity authentication bit string, and the rest is information of a key bit string:

$x_1, x_2 \ldots x_i, x_{i+1} \ldots x_{i+m}, x_{i+m+1} \ldots x_n$ ($x_i \in \{0,1\}$, i=1, ..., n−m)

The sender sends encoded quantum states ($|\varphi_{j_1}^{x_1}$, $|\varphi_{j_2}^{x_2} \ldots |\varphi_{j_i}^{x_i}, |\varphi_{j_{i+1}}^{x_{i+1}} \ldots |\varphi_{j_{i+m}}^{x_{i+m}}, |\varphi_{j_{i+m+1}}^{x_{i+m+1}} \ldots |\varphi_{j_n}^{x_n}$) of the above binary bit string to the receiver at the time points $t_1$, $t_2 \ldots t_n$, and $j_1, j_2, \ldots j_i, j_{i+1} \ldots j_{i+m}, j_{i+m+1}, \ldots j_n$ is a preparation basis sequence adopted by the sender, in which $j_1, j_2, \ldots j_i$ and $j_{i+m+1}, \ldots j_n$ are random quantum state preparation bases corresponding to the key bit string, and $j_{i+1} \ldots j_{i+m}$ are quantum state preparation bases of the identity authentication bit string selected in accordance with the preset basis vector selection rule.

Correspondingly, in some embodiments, in the subsequent step 102, the receiver uses a measurement basis sequence $k_1, k_2 \ldots k_i, k_{i+1} \ldots k_{i+m}, k_{i+m+1} \ldots k_n$ to measure the received quantum states, in which $k_1, k_2, \ldots k_i$ and $k_{i+m+i}, \ldots k_n$ are random quantum state measurement bases corresponding to the key quantum states, $k_{i+1} \ldots k_{i+m}$ are measurement bases corresponding to the identity authentication quantum states. The measurement bases $k_{i+1} \ldots k_{i+m}$ are also selected in accordance with the preset basis vector selection rule.

In some embodiments, a basis vector selection rule that the devices of the sender and the receiver follow can be set by using different policies. For example, it is feasible to select corresponding preparation bases or measurement bases in accordance with positions of identity authentication bits in the quantum state information prepared by the sender. For example, in one embodiment, the following rule is used: a corresponding horizontal polarization basis, vertical polarization basis, left-handed polarization basis or right-handed polarization basis is selected in accordance with different results of position information of each identity authentication bit in the quantum state information mod 4. In some embodiments, each identity authentication bit is prepared with a preparation basis, and different identity authentication bits have different preparation bases. Both scenarios are contemplated in the present application. In the description, although a preparation and measurement basis may be referred to in singular form, they should cover both singular and plural forms.

By use of the aforementioned manner of describing the binary bit string, assuming i+m=l, in the embodiment, the preparation bases and the measurement bases corresponding to the identity authentication quantum state satisfy the following condition:

$$f(l) = \begin{cases} \text{horizontal polarization state } H, & l \bmod 4 = 0 \\ \text{vertical polarization state } V, & l \bmod 4 = 1 \\ +45° \text{ polarization state } +, & l \bmod 4 = 2 \\ -45° \text{ polarization state } -, & l \bmod 4 = 3 \end{cases}$$

The above gives an example of the preset basis vector selection rule. In some embodiments, other basis vector selection rules different from the foregoing rule can be preset for the sender and the receiver. For example, a different algorithm can be adopted, as long as the sender and the receiver select the preparation bases and the measurement bases of the identity authentication quantum states by using the same rule.

In some embodiments, the sender selects quantum state preparation bases for an identity authentication bit string in accordance with a preset basis vector selection rule, then uses preset different wavelengths to bear quantum states of the identity authentication bit string and quantum states of the randomly generated key bit string, and sends the quantum states to a peer device that participates in the quantum key distribution process. The identity authentication bit string is interleaved in the key bit string with random positions and lengths, which can thus effectively avoid that identity authentication information is eavesdropped and avoid middle-man attacks and DDoS attacks in the quantum key distribution process.

Step 103: The receiver measures the received quantum states in accordance with the different wavelengths and the basis vector selection rule and obtains identity authentication quantum state information (also referred to as identity authentication information) from measuring the identity authentication bit string. The receiver may also measure the quantum states of the key bit string, and obtain key quantum state information (also referred to as key information).

Step 104: The receiver determines if the identity authentication information obtained through measurement corresponds with the basis vector selection rule. If yes, the method proceeds to step 105; otherwise the method proceeds to step 106.

Step 106: The quantum key distribution process ends.

Step 105: The receiver selects a receiver authentication key from the identity authentication information.

Step 107: The receiver sends position information of the receiver authentication key and a preset shared key encrypted with the receiver authentication key.

In some embodiments, after the sender executes step 101 to send the quantum state information, the sender and the receiver can, through an interaction process, complete an identity authentication process of the sender and the receiver in accordance with measurement results of the identity authentication quantum states and verification of the shared key preset by both parties, and then continue the subsequent key agreement process in accordance with the quantum key distribution protocol. In order to improve execution efficiency of key distribution and decrease the number of times of interaction, an alternative example of performing identity authentication in various stages of key agreement is provided.

In some embodiments, the receiver not only completes measurement of conventional key quantum states, but also verifies the identity of the sender in accordance with measurement results of the identity authentication quantum state information. The process includes sub-steps 201 to 208, and is further described below with reference to FIG. 2.

Figure 2:
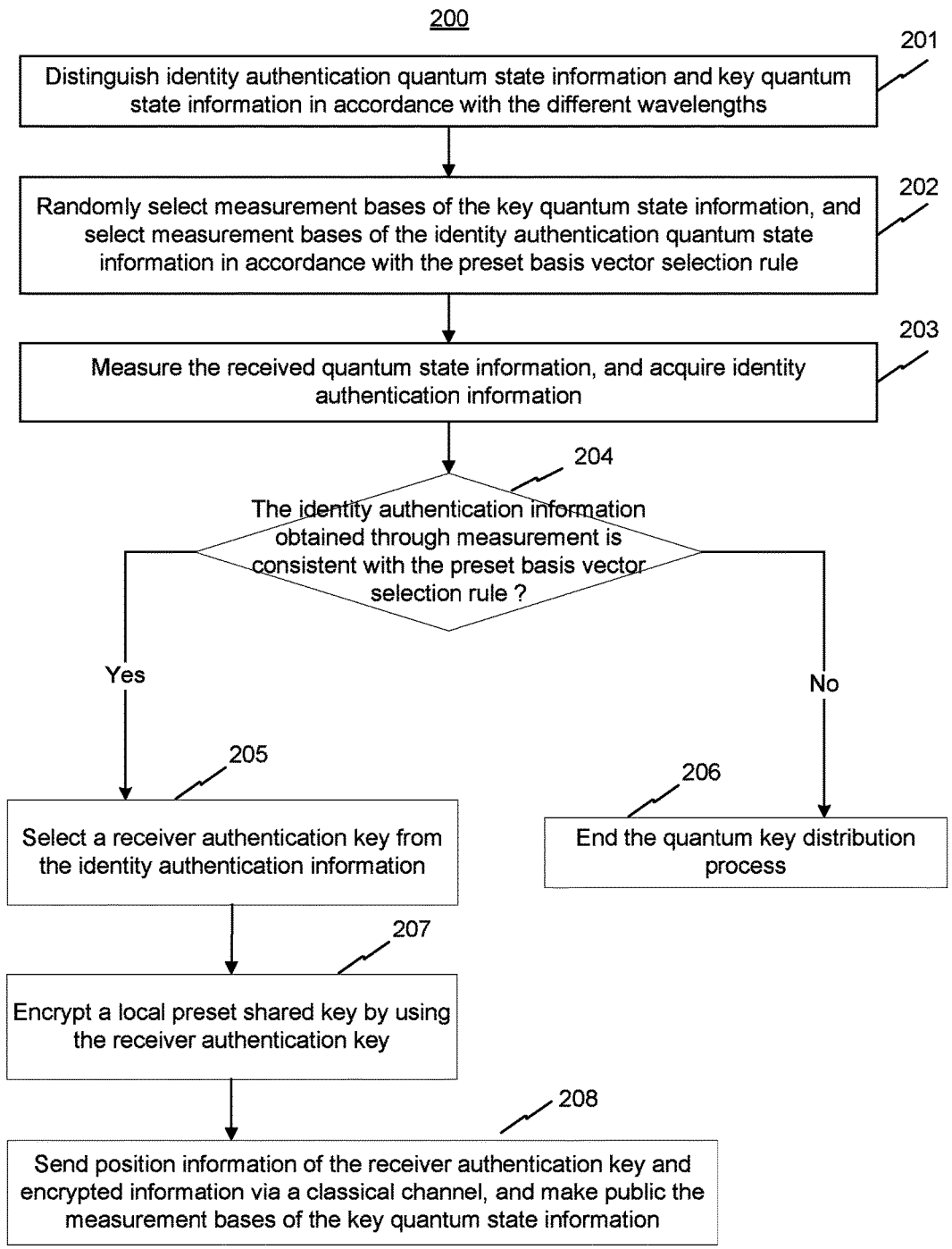
FIG. 2 is a flow diagram illustrating an identity authentication method, according to another exemplary embodiment.

FIG. 2 is a flow diagram illustrating an identity authentication method 200 from the receiver end, according to an exemplary embodiment. The method includes a number of steps, some of which are optional.

Step 201: Distinguishing identity authentication quantum state information and key quantum state information in accordance with their different wavelengths.

In some embodiments, as the sender sends the identity authentication quantum state and the key quantum state by using different wavelengths, the receiver can distinguish the above two kinds of information from the received quantum state information in accordance with the same wavelength setting as that for the sender.

Step 202: Randomly selecting measurement bases for the key quantum state information, and selecting measurement bases for the identity authentication quantum state information in accordance with the preset basis vector selection rule.

In some embodiments, for the part of the key quantum state, it is possible to randomly select the measurement bases in accordance with the quantum key distribution protocol (for example, BB84 protocol), and for the part of the identity authentication quantum state, the corresponding measurement bases are selected in accordance with the preset basis vector selection rule. This is described in connection with step 101 above, which is not repeated herein.

Step 203: Measuring the received quantum state information, and acquiring identity authentication information.

In some embodiments, the key quantum states are measured, and an original measurement result with respect to the key information is acquired.

In some embodiments, the measurement bases selected in accordance with the preset basis vector selection rule in step 202 is used to measure the received identity authentication quantum state information, and considering that attenuation may exist in quantum channels, parts where no photon is detected therein are eliminated, and identity authentication information obtained through measurement is acquired.

Step 204: Determining whether the identity authentication information obtained is consistent with the preset basis vector selection rule. If they are consistent, step 205 is executed, and otherwise, step 206 is executed, where the quantum key distribution process is ended.

As the sender and the receiver which participate in the quantum key distribution process preset the same basis vector selection rule for the identity authentication information, the sender follows the rule to select preparation bases and send a quantum state of the identity authentication information, and the receiver also follows the rule to select measurement bases that measures a corresponding quantum state; therefore, after the photons undetected due to attenuation are eliminated, identity authentication information measured by the receiver should be consistent with corresponding expected information.

In some embodiments, for the receiver, if the identity authentication information obtained through measurement is consistent with the corresponding expected information, it can be considered that the basis vector selection rule adopted by the sender for the identity authentication information is the same as that adopted by the receiver, and only the sender with a legal identity can know the rule; therefore, it can be determined that the sender has passed the identity authentication. In this situation, the identity authentication quantum state information obtained through measurement by the receiver can be considered or referred to as corresponding with or consistent with the basis vector selection rule.

In some embodiments, in a quantum channel transmission process, it is likely to result in that measurement results of individual quantum states are not as expected due to noise interference and other factors. If, in this case, it is considered that the sender does not pass the identity authentication and the quantum key distribution process is ended, it will cause unnecessary reduction of the quantity of quantum key distribution. In consideration of the foregoing situation as well as the demands for defending the middle-man attacks and the DDoS attacks, it is feasible to adopt a manner of setting a threshold, that is: if a difference between the identity authentication information measured by the receiver and the expected information conforming to the basis vector selection rule is less than a preset threshold, for example, the number of inconsistent bits between the measurement results and the expected information is less than a preset upper limit, the receiver can consider that the sender has passed the identity authentication.

Step 205: Select a receiver authentication key from the identity authentication information.

In the foregoing step 204, the receiver has verified the identity of the sender. Next, the receiver needs to prove validity of its own identity to the sender. The verification of the receiver can be implemented by the sender by comparing preset shared keys. The receiver can encrypt a local preset shared key with the identity authentication information acquired from the quantum states, and provide to the sender for verification, that is to say, the identity authentication information is directly used as a receiver authentication key IDkey.

In some embodiments, in order to avoid that a malicious middle-man or an attacker also follows the above manner to perform encryption transmission of the stolen shared keys by using stolen identity authentication information, the receiver may not directly use the identity authentication information as the IDkey, but randomly selects bits in different positions from the identity authentication information and uses a bit string made up of the selected bits as the receiver authentication key IDkey.

Step 207: Encrypt a local preset shared key by using the receiver authentication key.

The receiver uses the IDkey selected in step 205 to encrypt a local preset shared key.

In some embodiments, in order that the identity of an information publisher can still be verified in other subsequent states of the quantum key distribution process, for example, when correct measurement bases are published, and security of the key distribution process is further ensured, the information encrypted by the receiver with the IDkey can include not only the preset shared key, but also locally generated auxiliary authentication information m.

Step 208: Send position information of the receiver authentication key and encrypted information including the local preset shared key of the receiver via a classic channel, and publicize the measurement bases of the key quantum state information.

The receiver sends position information corresponding to the IDkey selected in step 205 and encrypted information obtained by executing step 207 via a classic channel.

The receiver can also, in accordance with a quantum key distribution protocol, publicize the measurement bases adopted by the receiver to measure the key quantum state via the classic channel.

Referring back to FIG. 1, Step 108: The sender selects a corresponding sender authentication key in accordance with the received position information. The sender has the identity authentication information (the identity authentication bit string). With the received position information, the sender can identify the corresponding sender authentication key.

Step 109: The sender uses the corresponding sender authentication key to decrypt the encrypted information received from the receiver. The received information contains the preset shared key. After the sender decrypt the received information, the sender obtains the preset shared key, and compares it with the local preset shared key, and determines whether it is consistent with the local preset shared key.

Step 110: The quantum key distribution process ends if the received information including the preset shared key is not consistent with the local preset shared key.

In some embodiments, the sender receives the measurement bases made public by the receiver, the position information of a selected IDkey and the encrypted information via the classic channel. The sender, in accordance with the position information and the quantum state information sent by itself in step 101, obtains a sender authentication key, that is, an IDkey of the sender, and uses the IDkey to decrypt the received encrypted information, to acquire a preset shared key after decryption and auxiliary authentication information. Then, whether the preset shared key from the receiver after decryption is consistent with the local preset shared key of the sender is determined. For the sender, if the encrypted information sent by the receiver is decrypted with its own IDkey and preset shared key information obtained is consistent with the local preset shared key, it indicates that the preset shared key of the receiver is the same as the sender's local preset shared key, and only the receiver with a legal identity may have the same shared key. On the other hand, it also indicates that the receiver follows the same basis vector selection rule as that of the sender to select measurement bases and use a correct IDkey to perform an encryption operation, so that the sender can decrypt the preset shared key consistent with the local one. Therefore, it can be determined that the receiver passes the identity authentication. On the contrary, if they are not consistent, it can be considered that the receiver may be a middle-man or an attacker, and thus the quantum key distribution process is ended.

If the sender determines that the identity of the receiver is legal, in accordance with the procedure of the quantum key distribution protocol, the sender can compare the measurement bases made public by the receiver with the preparation bases used by the sender, select correct measurement bases therefrom, select original keys in accordance with the correct measurement bases, and publicize the correct measurement bases to the receiver via a classic channel.

So far, through step 101-step 110, the receiver verifies the identity of the sender by determining whether the identity authentication quantum state information corresponds with the basis vector selection rule; the sender verifies the identity of the receiver by comparing the preset shared keys. If both the sender and the receiver pass the above verification, execution of the subsequent key distribution process can be continued in accordance with the procedure of the quantum key distribution protocol.

In some embodiments, in order to further ensure the security of the key distribution process, identity authentication and data encryption procedures can be performed in alternate in the subsequent distribution process, and such an example is further described below.

1) The sender encrypts a variant of the auxiliary authentication information, and sends the encrypted information including the variant of the auxiliary authentication information.

As described above, in steps 107-110, the sender acquires the auxiliary authentication information after decryption, and after the sender verifies that the identity of the receiver is valid, the sender can first encrypt a variant of the auxiliary authentication information after decryption by using a preset policy, and then, when the correct measurement bases of the key quantum state is published via a classic channel, send the encrypted information after the encryption operation is executed.

The preset policy may be preset by both the sender and the receiver, and may also be determined through negotiation. The preset policy may include, for example, executing the encryption operation by using the preset shared key; or executing the encryption operation by using an IDkey.

The variant of the auxiliary authentication information refers to information generated based on the auxiliary authentication information. For example, the variant may be the auxiliary authentication information per se; or the variant is a result obtained by processing the auxiliary authentication information by using a preset mathematical transformation method, for example, m+1 (where m is the auxiliary authentication information). Both the sender and the receiver can preset the same variant generation algorithm or function, so as to ensure that variant information generated by the both parties for the same auxiliary authentication information m is consistent.

2) After the receiver receives the correct measurement bases and the encrypted information, the identity of the sender is verified by decrypting the encrypted information.

First, the receiver decrypts the received encrypted information in a manner corresponding to the preset policy adopted by the sender. For example, if the sender executes the encryption operation by using the IDkey, the receiver also executes the decryption operation by using its own IDkey; if the sender executes the encryption operation by using the local preset shared key, the receiver also executes the decryption operation by using the local preset shared key.

Then, whether information obtained after the decryption operation is consistent with a variant of the locally generated auxiliary authentication information m is determined. The auxiliary authentication information m is locally generated by the receiver originally and is sent to the sender in a form of encryption via a classic channel. After the auxiliary authentication information is decrypted and recovered by the sender, the variant of the auxiliary authentication information is encrypted again by using a preset policy and sent to the receiver. Then, if a result after decryption by the receiver is consistent with a variant of the local originally generated auxiliary authentication information, it indicates that the sender not only can successfully decrypt and recover the auxiliary authentication information m, but also the encryption manner and the variant generation algorithm or function adopted by the sender are in line with those of the receiver, so that the receiver re-verifies the identity of the sender, and it also indicates that the correct measurement bases of the key quantum state made public by the sender via the classic channel is credible.

Therefore, if the judgment result is "Yes", the receiver can, in accordance with the correct measurement bases made public via the classic channel, select original keys, and publicize measurement results of some key quantum states via the classic channel, so as to perform subsequent bit error rate estimation; if the judgment result is "No", it indicates that the identity of the sender is not credible, and thus the quantum key distribution process can be ended.

The sender can also encrypt the variant of the auxiliary authentication information by using a dynamic change algorithm or function, as long as the receiver knows a corresponding rule of calculating the variant, and thus, the security can be further improved. For example, the sender calculates the variant in the following manner at the first time: the auxiliary authentication information+1, and the receiver compares the information after decryption with the variant m+1 of the local originally generated auxiliary authentication information m; the sender calculates the variant in the following manner at the second time: the auxiliary authentication information+2, and the receiver compares the information after decryption with the variant m+2 of the local originally generated auxiliary authentication information m.

3) After the sender estimates a bit error rate, the bit error rate is encrypted with the IDkey and sent to the receiver.

The sender estimates a bit error rate in accordance with the measurement results of some key quantum states made public by the receiver. If the bit error rate is within a certain threshold range, an error is corrected by using an error correcting technology. Then privacy amplification can be further performed on a quantum key that has been error-corrected, so as to eliminate information leakage caused in a communication process and an error correcting process, and finally an unconditionally secure shared quantum key is extracted. If the bit error rate exceeds a certain threshold, the quantum key distribution process can be abandoned.

If the bit error rate does not exceed the threshold, after the sender completes the above operations, the bit error rate can be sent to the receiver for reference, so as to ensure that the both parties make the same judgment and execute subsequent privacy amplification and other processing operations based on the same policy, thus acquiring the same shared quantum key. In order to avoid that a middle-man or an attacker steals the bit error rate information, the sender can encrypt the bit error rate with the IDkey and send the information after encryption to the receiver.

4) The receiver decrypts the received information, acquires a bit error rate, and executes corresponding processing.

After receiving encrypted information of the bit error rate, the receiver decrypts the information with the IDkey and acquires the bit error rate estimated by the sender. The receiver can execute the same operation as that executed by the sender in accordance with the bit error rate and can also compare a bit error rate estimated by itself with the bit error rate sent by the sender. If a difference between them is within a preset range, that is to say, judgment results based on the bit error rates and subsequent processing policies of the sender and the receiver are the same, the receiver can continue to execute the subsequent operations, and finally acquire an unconditionally secure shared quantum key which is the same as that of the sender.

Through steps 101-110, identity authentication on the sender and the receiver is implemented by the quantum key distribution process. In some embodiments, key information and identity authentication information are distinguished by using different wavelengths, the quantum states of the identity authentication information with a variable length is randomly interleaved in the key quantum states, and both the sender and the receiver complete an identity authentication process by detecting whether a peer device follows the same basis vector selection rule when selecting preparation bases or measurement bases and whether the peer device has the same preset shared key. The embodiments of the present application achieves identity verification by making full use of security of quantum and performing identity authentication through quantum state information. The disclosed methods not only can effectively defend middle-man attacks and DDOS attacks and guarantee security of the quantum key distribution process, but also will not cause reduction of the quantity of quantum key distribution.

Figure 3:
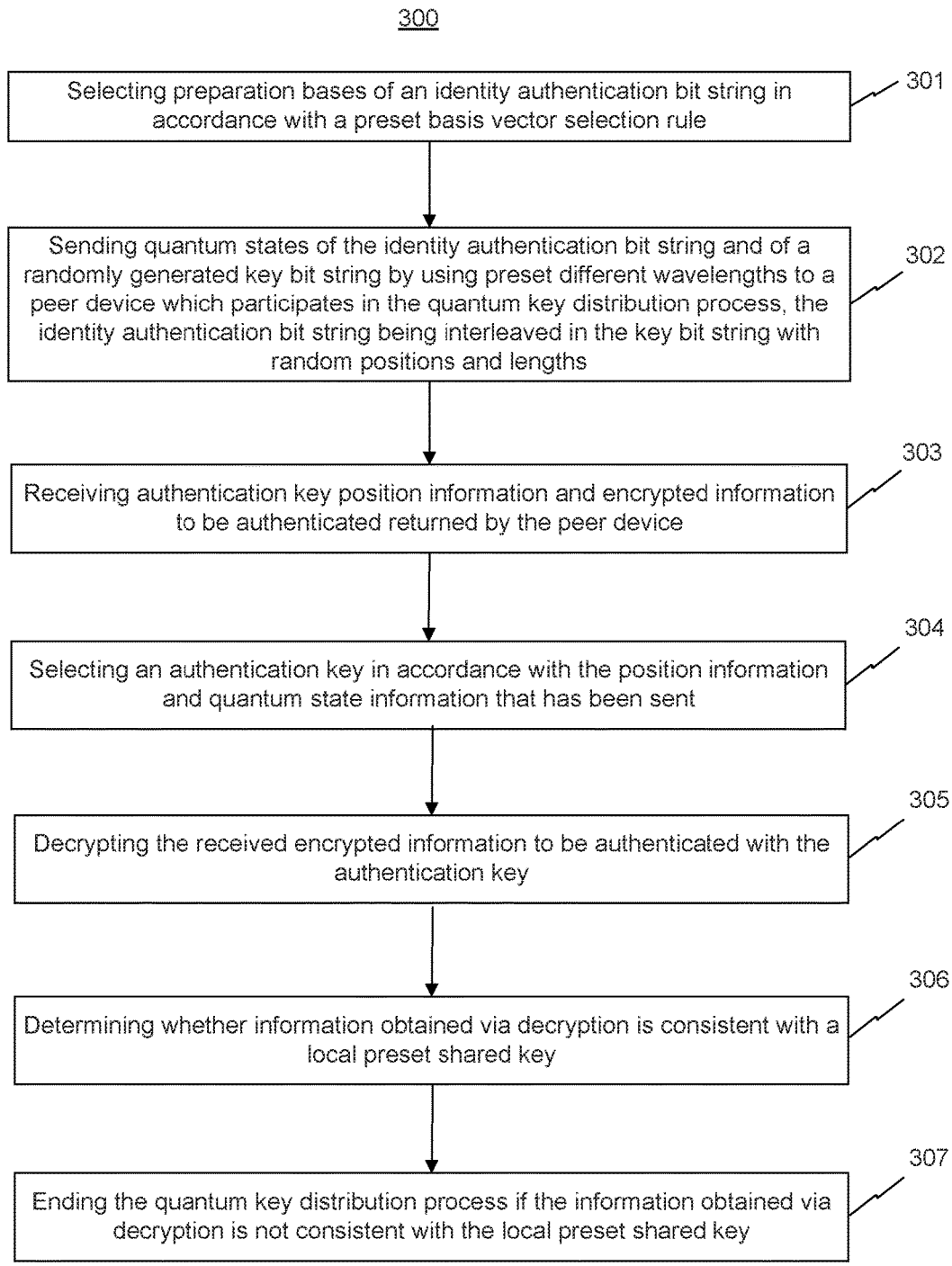
FIG. 3 is a flow diagram illustrating an identity authentication method, according to another exemplary embodiment.

FIG. 3 is a flow diagram illustrating an identity authentication method 300, according to another exemplary embodiment. The method includes a number of steps, some of which are optional. Some parts of this example are the same as the steps of the first example above. These parts are not repeated, and the following description focuses on their differences. The method includes the following steps:

Step 301: Select preparation bases for an identity authentication bit string in accordance with a preset basis vector selection rule.

Step 302: Send quantum state information of the identity authentication bit string and of a randomly generated key bit string by using preset different wavelengths to a peer device at a receiver end which participates in the quantum key distribution process, the identity authentication bit string being interleaved in the key bit string with random positions and lengths.

In some embodiments, before the step, it is feasible to first send a quantum key agreement request to the peer device, the request including account information of the sender, to allow the peer device to verify the sender's identity. It is feasible to receive account information sent by the peer device and verify the identity of the opposite side in accordance with the account information. If any of the above verifications fails, the quantum key distribution process is ended; if the verification succeeds, the step can be executed to send quantum states.

In some embodiments, the preset basis vector selection rule includes: selecting corresponding preparation bases in accordance with positions of identity verification bits in the quantum state information of the identity authentication bit string and the key bit string, for example, selecting a corresponding horizontal polarization basis, vertical polarization basis, left-handed polarization basis or right-handed polarization basis in accordance with different results of position information of each identity verification bit in the quantum state information mod 4.

Step 303: Receive authentication key position information and encrypted information to be authenticated returned by the peer device.

In some embodiments, the information returned by the peer device not only includes: authentication key position information and encrypted information to be authenticated, but also includes: measurement bases used for measurement of key quantum states. The encrypted information includes a local preset shared key at the receiver end.

Step 304: Select an authentication key in accordance with the position information and the quantum state information that has been sent by the sender.

Step 305: Decrypt the received encrypted information to be authenticated with the authentication key.

Step 306: Determine whether information after decryption is consistent with a local preset shared key at the sender end.

Step 307: End the quantum key distribution process if the information obtained via decryption is not consistent with the local preset shared key.

In some embodiments, if the information obtained via decryption is consistent with the local preset shared key, execution of the subsequent operations can be continued in accordance with a quantum key distribution protocol:

determining correct measurement bases of the key quantum states, and selecting original keys;

publicizing the correct measurement bases of the key quantum states via a classic channel; and acquiring a final shared quantum key through bit error rate estimation, error correction and privacy amplification processes.

In some embodiments, if auxiliary authentication information sent by the receiver is also received in step 303, when the determination result of the step 306 is "Yes", it is also feasible to encrypt a variant of the auxiliary authentication information and, while the correct measurement bases are made public, send encrypted information of the variant of the auxiliary authentication information, to allow the receiver to perform further verification. In addition, after a bit error rate is estimated, it is also feasible to encrypt the bit error rate with the authentication key selected in steps 304-305 and send the encrypted bit error rate to the receiver.

Figure 4:
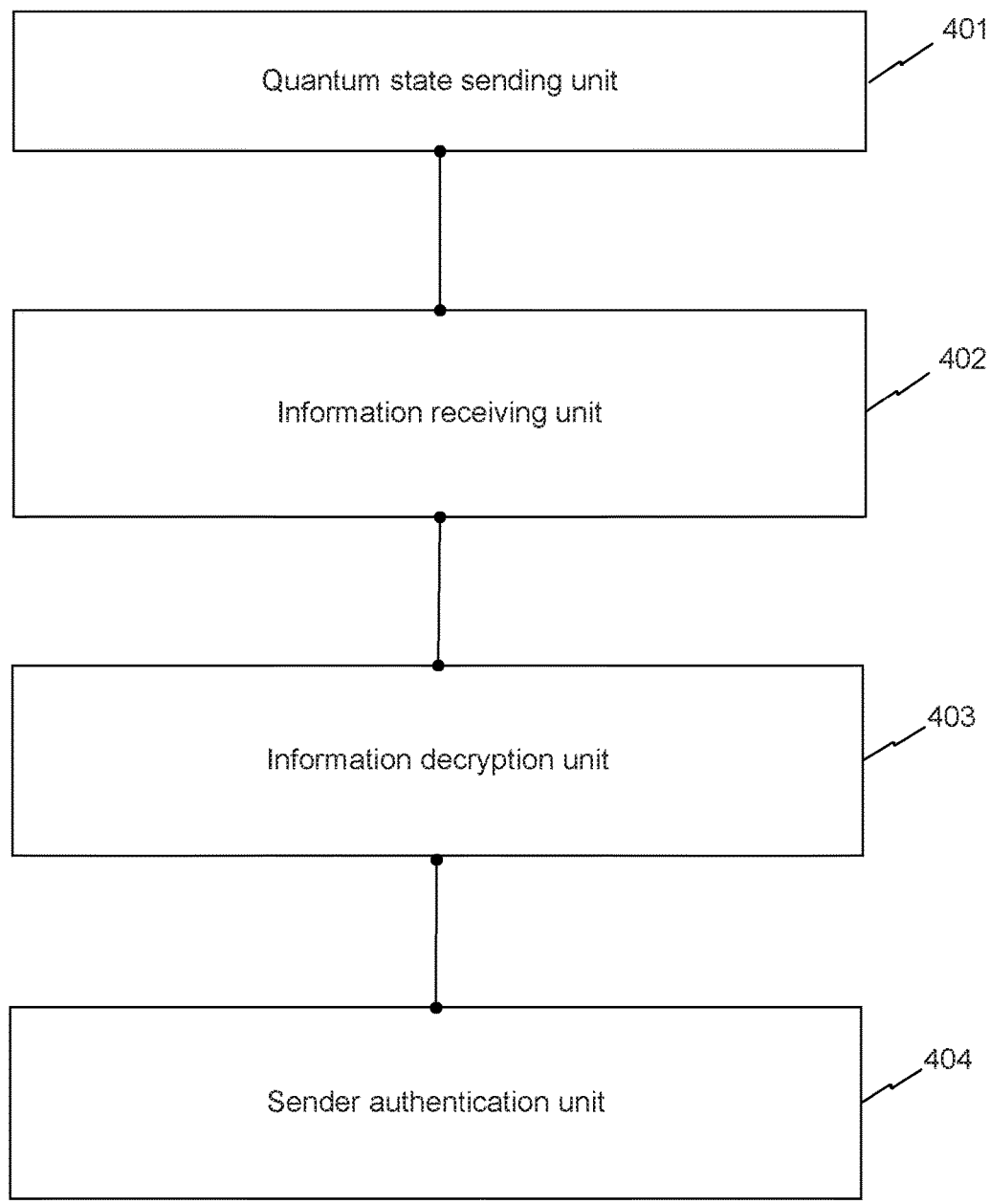
FIG. 4 is a block diagram illustrating an identity authentication device, according to an exemplary embodiment.

FIG. 4 is a block diagram illustrating an identity authentication device 400, according to an exemplary embodiment. The device may be deployed on a quantum communication sender device which participates in the quantum key distribution process. The apparatus can be used to implement the above-described methods. In other words, the above-described methods can be considered as exemplary functions of the apparatus. Thus, the description of the functions of the apparatus below is relatively simple, and reference can be made to the corresponding description of the method steps.

In some embodiments, an identity authentication apparatus for a quantum key distribution process includes: a quantum state sending unit 401 configured to select preparation bases for an identity authentication bit string in accordance with a preset basis vector selection rule, and send quantum state information of the identity authentication bit string and a randomly generated key bit string by using preset different wavelengths to a peer device at a receiver end which participates in the quantum key distribution process, the identity authentication bit string being interleaved in the key bit string with random positions and lengths; a response information receiving unit 402 configured to receive authentication key position information and encrypted information to be authenticated returned by the peer device; an information decryption unit 403 configured to select an authentication key in accordance with the position information and the quantum state information that has been sent, and decrypt the received encrypted information to be authenticated with the authentication key; and a sender authentication judgment unit 404 configured to determine whether information obtained via decryption is consistent with a local preset shared key; and if no, end the quantum key distribution process.

In some embodiments, the information received by the response information receiving unit 402 not only includes the authentication key position information and the encrypted information to be authenticated, but also includes measurement bases used for measurement of a key quantum state.

The apparatus may further include:
an original key selection unit configured to, when an output result of the authentication judgment unit is Yes, determine correct measurement bases for the key quantum states, and select original keys;
a correct measurement basis publishing unit configured to publicize the correct measurement bases of the key quantum state via a classic channel; and
a sender quantum key acquisition unit configured to acquire a final shared quantum key through bit error rate estimation, error correction and privacy amplification processes.

In some embodiments, the apparatus may further include:
an agreement request sending unit configured to send a quantum key agreement request to the peer device, the request including account information of the sender;
an account information receiving unit configured to receive account information sent by the peer device; and
a first identity authentication unit configured to verify the identity of the peer device according to the account information, and if the verification fails, end the quantum key distribution process.

In some embodiments, the preset basis vector selection rule adopted by the quantum state sending unit includes: selecting corresponding preparation bases in accordance with positions of identity verification bits in the quantum state information.

In some embodiments, the preset basis vector selection rule adopted by the quantum state sending unit refers to selecting a corresponding horizontal polarization basis, vertical polarization basis, left-handed polarization basis or right-handed polarization basis in accordance with different results of position information of each identity verification bit in the quantum state information mod 4.

Figure 5:
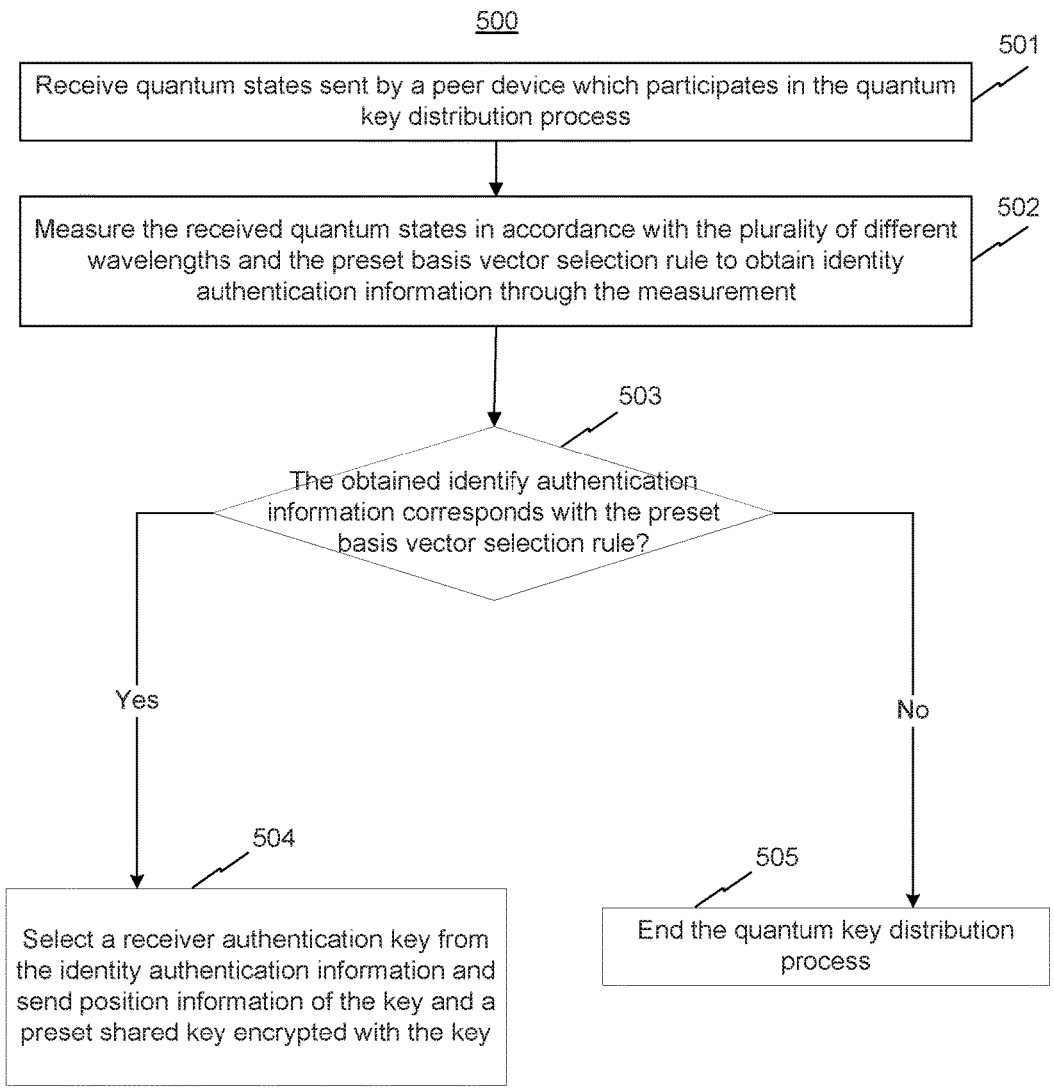
FIG. 5 is a flow diagram illustrating an identity authentication method, according to another exemplary embodiment.

FIG. 5 is a flow diagram illustrating an identity authentication method 500, according to another exemplary embodiment. The method may be implemented on a quantum communication receiver device which participates in the quantum key distribution process. The parts of this example which are the same as the steps of the first example above are not repeated, and the following focuses on their differences. The method includes the following steps:

Step 501: Receive quantum state information sent by a peer device at sender end which participates in the quantum key distribution process.

In some embodiments, before this step, it is feasible to receive a key agreement request sent by the peer device and verify the identity of the opposite side in accordance with account information included in the request. If the verification fails, the quantum key distribution process is ended; if the verification succeeds, account information of the receiver is sent to the peer device, and the step can be executed to receive the quantum state information sent by the peer device.

Step 502: Measure the quantum states in the received quantum state information in accordance with different wavelengths and a preset basis vector selection rule, and acquire identity authentication information in accordance with measured results.

In some embodiments, the preset basis vector selection rule includes: selecting corresponding measurement bases in accordance with positions of identity verification bits in quantum state information, for example, selecting a corresponding horizontal polarization basis, vertical polarization basis, left-handed polarization basis or right-handed polarization basis in accordance with different results of position information of each identity verification bit in the quantum state information mod 4.

In some embodiments, the step may include the following sub-steps: distinguishing identity authentication quantum state information and key quantum state information in accordance with the preset different wavelengths; selecting measurement bases of the identity authentication quantum state information in accordance with the preset basis vector selection rule; and measuring the identity authentication quantum state information by using the selected measurement bases, and eliminating parts where no photon is detected therein, to acquire the identity authentication information.

Step 503: Determine whether the identity authentication information corresponds with the basis vector selection rule. If yes, execute step 504; and otherwise, execute step 505, where the quantum key distribution process is ended.

Step 504: Select an authentication key from the identity authentication information, and send position information of the authentication key and a preset shared key encrypted with the authentication key to the peer device.

In some embodiments, the selecting an authentication key from the identity authentication information includes: selecting the identity authentication information as the authentication key; or randomly selecting bits in different positions from the identity authentication information, and taking a bit string made up of the selected bits as the authentication key.

In some embodiments, it is also feasible to use the authentication key to encrypt locally generated auxiliary authentication information m, and send encrypted information to the peer device along with the position information and the encrypted preset shared key.

In some embodiments, the measurement bases used for measurement of a key quantum state can be published by the receiver device via a classic channel.

In some embodiments, after this step, the following operations can also be executed:

1) Receive correct measurement bases of the key quantum state sent by the peer device via the classic channel.

If encrypted information of a variant of the auxiliary authentication information is received at the same time, a decryption operation is executed, and whether the variant of the auxiliary authentication information is consistent with a variant of local originally generated auxiliary authentication information is verified. If they are consistent, the subsequent operations such as selecting original keys are executed, and otherwise, the quantum key distribution process is ended.

2) Select original keys, and acquire a final shared quantum key through bit error rate acquisition, error correction and privacy amplification processes.

If encrypted information including a bit error rate sent by the sender is received after the original keys are selected, decryption can be performed by using the authentication key selected in step 504, and subsequent processes such as error correction and privacy amplification are executed in accordance with the result, to acquire the final shared quantum key.

Figure 6:
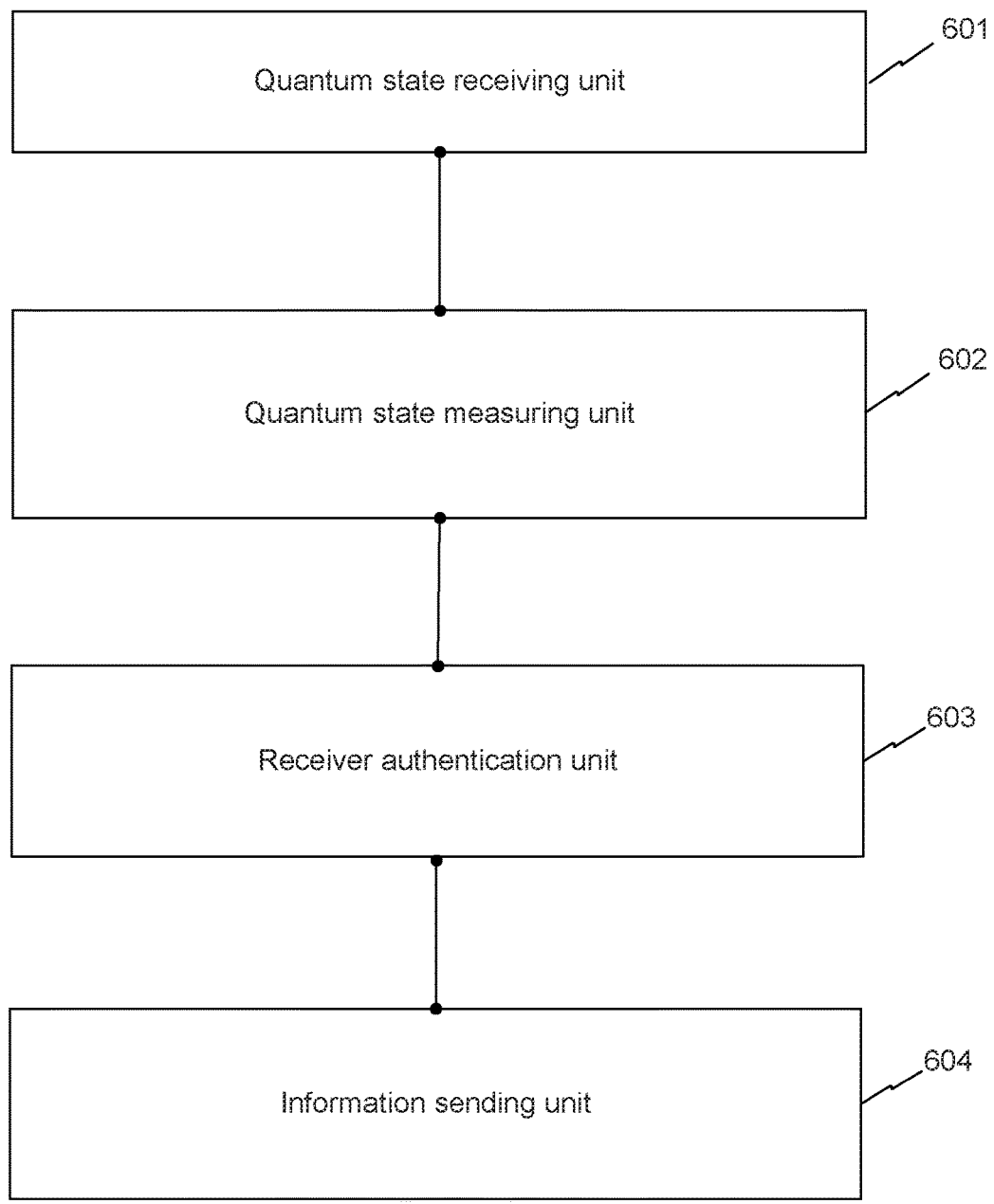
FIG. 6 is a block diagram illustrating an identity authentication device, according to another exemplary embodiment.

FIG. 6 is a block diagram illustrating an identity authentication device 600, according to another exemplary embodiment. The apparatus may be deployed on a quantum communication receiver device which participates in the quantum key distribution process. The apparatus can be used to implement the methods described above. In other words, the above-described methods can be considered as exemplary functions of the apparatus. Thus, the description of the functions of the apparatus below is relatively simple, and reference can be made to the corresponding description of the methods.

An identity authentication apparatus for a quantum key distribution process of this example includes: a quantum state receiving unit 601 configured to receive quantum state information sent by a peer device at a sender end which participates in the quantum key distribution process; a quantum state measurement unit 602 configured to measure the received quantum states in the quantum state information in accordance with preset different wavelengths and a preset basis vector selection rule, and acquire identity authentication information in accordance with measured results; a receiver authentication judgment unit 603 configured to determine whether the identity authentication information corresponds with the basis vector selection rule, and if no, end the quantum key distribution process; and an information sending unit 604 configured to, when an output of the receiver authentication judgment unit is Yes, select an authentication key from the identity authentication information, and send position information of the authentication key and a preset shared key encrypted with the authentication key to the peer device.

In some embodiments, the apparatus may further include a measurement basis publishing unit configured to, when an output of the receiver authentication judgment unit is Yes, publicize measurement bases used for measurement of a key quantum state via a classic channel.

In some embodiments, the apparatus may further include:

a correct measurement basis receiving unit configured to receive correct measurement bases for the key quantum states sent by the peer device via the classic channel; and a receiver quantum key acquisition unit configured to select original keys, and acquire a final shared quantum key through bit error rate acquisition, error correction and privacy amplification processes.

In some embodiments, the apparatus further includes:

an agreement request receiving unit configured to receive a key agreement request sent by the peer device; and a second identity authentication unit configured to verify the identity of the peer device in accordance with account information included in the request. If the verification fails, end the quantum key distribution process, and otherwise, send account information of the receiver to the peer device.

In some embodiments, the preset basis vector selection rule adopted by the quantum state measurement unit includes: selecting corresponding bases in accordance with positions of identity verification bits in quantum state information.

In some embodiments, the preset basis vector selection rule adopted by the quantum state measurement unit refers to: selecting a corresponding horizontal polarization basis, vertical polarization basis, left-handed polarization basis or right-handed polarization basis in accordance with different results of position information of each identity verification bit in the quantum state information mod 4.

In some embodiments, the quantum state measurement unit includes:

an information distinguishing subunit configured to distinguish identity authentication quantum state information and key quantum state information in accordance with the preset different wavelengths;

an identity authentication measurement basis selection subunit configured to select measurement bases of the identity authentication quantum state information in accordance with the preset basis vector selection rule; and an identity authentication information acquisition subunit configured to measure the identity authentication quantum state information by using the selected measurement bases, and eliminate parts where no photon is detected therein, to acquire the identity authentication information.

In some embodiments, the information sending unit includes:

an authentication key selection subunit configured to select an authentication key from the identity authentication information; and an information sending subunit configured to send position information of the authentication key and a preset shared key encrypted with the authentication key to the peer device;

in which the authentication key selection subunit is configured to:

select the identity authentication information as the authentication key; or randomly select bits in different positions from the identity authentication information, and take a bit string made up of the selected bits as the authentication key.

Figure 7:
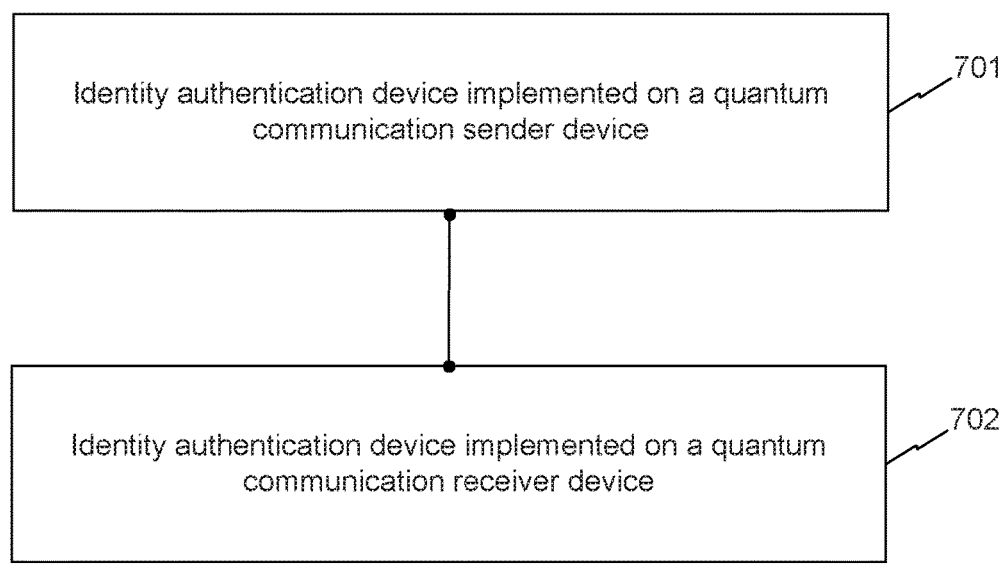
FIG. 7 is a block diagram illustrating an identity authentication system, according to an exemplary embodiment.

FIG. 7 is a block diagram illustrating an identity authentication system 700, according to an exemplary embodiment. The system includes: an identity authentication apparatus 701 deployed on a quantum communication sender device, and an identity authentication apparatus 702 deployed on a quantum communication receiver device. The identity authentication apparatuses, deployed on the quantum communication devices of the sender and the receiver, preset the same basis vector selection rule and the same shared key, and use the same wavelength setting to distinguish identity authentication information and key information.

The identity authentication apparatuses respectively deployed on the quantum communication devices of the sender and the receiver achieve dynamic verification on the identity of the peer device in the quantum key distribution process by using the identity authentication methods provided in the present application.

Figure 8:
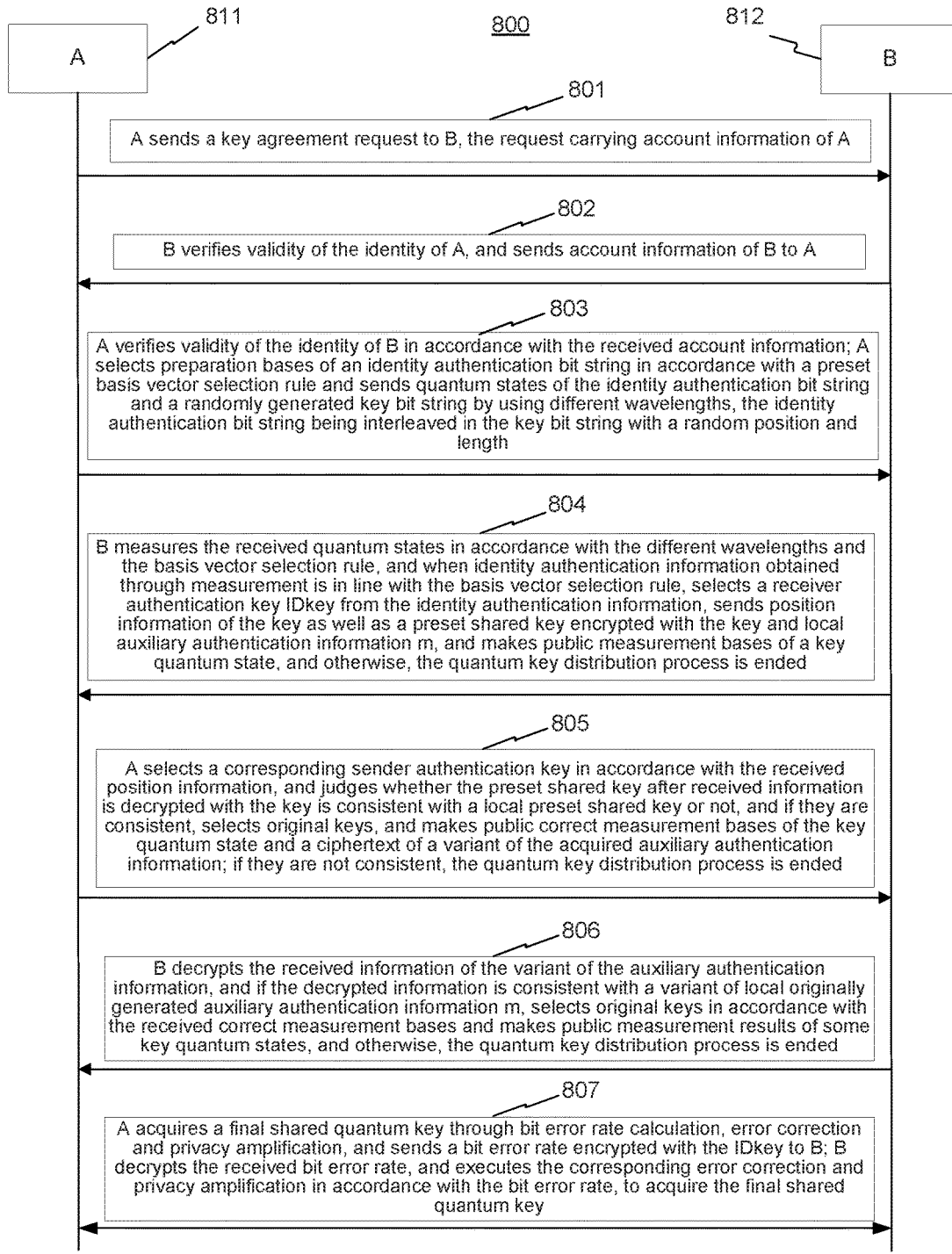
FIG. 8 is a flow diagram illustrating an identity authentication method, according to another exemplary embodiment.

FIG. 8 is a flow diagram illustrating an identity authentication method 800, according to another exemplary embodiment. The identity authentication apparatus deployed on the quantum communication sender device is referred to as A (811), and the identity authentication apparatus deployed on the quantum communication receiver device is referred to as B (812).

Step 801: A sends a key agreement request to B, the request carrying account information of A.

Step 802: B verifies validity of the identity of A, and sends account information of B to A.

Step 803: A verifies validity of the identity of B in accordance with the received account information; A selects preparation bases of an identity authentication bit string in accordance with a preset basis vector selection rule and sends quantum states of the identity authentication bit string and quantum states of a randomly generated key bit string by using different wavelengths, the identity authentication bit string being interleaved in the key bit string with random positions and lengths.

Step 804: B measures the received quantum states in accordance with the different wavelengths and the basis vector selection rule, and when identity authentication information obtained through measurement corresponds with the basis vector selection rule, selects a receiver authentication key IDkey from the identity authentication information, sends position information of the receiver authentication key as well as a preset shared key encrypted with the receiver authentication key and local auxiliary authentication information m, and publicizes measurement bases of a key quantum state, and otherwise, the quantum key distribution process is ended.

Step 805: A selects a corresponding sender authentication key (IDkey) in accordance with the received position information, decrypts, with the corresponding sender authentication key, the received encrypted information to obtain the preset shared key, and determines whether the preset shared key is consistent with a local preset shared key, and if they are consistent, selects original keys, and publicizes correct measurement bases for the key quantum states and encrypted information of a variant of the acquired auxiliary authentication information; if they are not consistent, the quantum key distribution process is ended.

Step 806: B decrypts the encrypted information of the variant of the auxiliary authentication information, and if the decrypted encrypted information is consistent with a variant of local originally generated auxiliary authentication information m, selects original keys in accordance with the received correct measurement bases and publicizes measurement results of some key quantum states, and otherwise, the quantum key distribution process is ended.

Step 807: A receives the measurement results of some key quantum states and calculates a bit error rate. A also acquires a final shared quantum key through the bit error rate calculation, error correction and privacy amplification, and sends the bit error rate encrypted with the IDkey to B; B decrypts the received bit error rate, and executes the corresponding error correction and privacy amplification in accordance with the bit error rate, to acquire the final shared quantum key.

It should be noted that, the above illustrates one implementation of the system, and different interaction manners can be adopted in other implementations. For example, it is feasible not to execute the identity authentication links based on the preset account information in 1) and 2), and in the processes of performing identity authentication of B on A in the link 4) and performing identity authentication of A on B in the link 5). It is also feasible not to use the auxiliary authentication information m, not to continue to use variant information of m for identity authentication in subsequent links, and not to use the IDkey to perform encryption, decryption and other operations on the bit error rate. Mutual authentication between A and B can be completed by verifying whether the identity authentication quantum state corresponds with the basis vector selection rule and whether the shared keys preset by A and B are consistent with each other in the links 3), 4) and 5).

The specification has described methods, apparatus, and systems for identity authentication. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable storage medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. An identity authentication method for a quantum key distribution process, the method performed by a receiver and comprising:
   receiving, from a sender, quantum state information including quantum states of an identity authentication bit string and quantum states of a randomly generated key bit string by using different wavelengths, the identity authentication bit string being interleaved in the key bit string at a random position and with a random length;
   measuring the received quantum states in the quantum state information in accordance with the different wavelengths and measurement bases selected according to a preset basis vector selection rule to obtain identity authentication information from a measurement of an identity authentication bit string;
   determining whether the identity authentication information obtained through the measurement corresponds with the preset basis vector selection rule; and
   in response to the determination that the identity authentication information obtained through the measurement corresponds with the preset basis vector selection rule:
      selecting a receiver authentication key from the identity authentication information;
      sending, to the sender, position information of the receiver authentication key in the identity authentication information obtained through the measurement and a preset shared key encrypted with the receiver authentication key, wherein the position information and the identity authentication bit string are used by the sender to select a corresponding sender authentication key and wherein the receiver authentication key is decrypted with a sender authentication key to obtain a new preset shared key; and
      ending the quantum key distribution process if the new preset shared key obtained by decrypting the receiver authentication key with the sender authentication key is not consistent with the local preset shared key.

2. The identity authentication method of claim 1, further comprising publicizing the measurement bases for measuring a key quantum state via a classic channel.

3. The identity authentication method of claim 1, further comprises:
   performing identity verification by using preset account information via a classic channel before the sender sends the quantum state information of the identity authentication bit string and of the randomly generated key bit string.

4. The identity authentication method of claim 3, wherein the preset account information comprises identity information and a certificate.

5. The identity authentication method of claim 1, wherein the preset basis vector selection rule comprises:
   selecting the preparation bases or the measurement bases in accordance with positions of identity authentication bits in the quantum state information.

6. The identity authentication method of claim 5, wherein selecting the corresponding preparation bases or the measurement bases in accordance with the positions of the identity authentication bits in the quantum state information includes:
   selecting a corresponding horizontal polarization basis, a vertical polarization basis, a left-handed polarization basis or a right-handed polarization basis in accordance with different results of position information of each identity authentication bit in a quantum state information mod 4.

7. The identity authentication method of claim 1, wherein measuring the received quantum states in the quantum state information in accordance with the different wavelengths and the measurement bases selected according to the basis vector selection rule includes:
   distinguishing identity authentication quantum state information and key quantum state information in accordance with the different wavelengths;
   measuring the identity authentication quantum state information by using the selected measurement bases; and
   eliminating parts of the selected measurement bases where no photon is detected to obtain the identity authentication information through the measurement.

8. The identity authentication method of claim 7, wherein the identity authentication information corresponds with the basis vector selection rule, if a difference between the identity authentication information measured by the receiver and expected information is less than a preset threshold.

9. The identity authentication method of claim 1, wherein selecting the receiver authentication key from the identity authentication information includes:
   taking the identity authentication information as the receiver authentication key; or
   selecting bits in different positions randomly from the identity authentication information, and taking a bit string made up of the selected bits as the receiver authentication key.

10. The identity authentication method of claim 1, wherein sending position information of the receiver authentication key in the identity authentication information obtained through the measurement and the preset shared key encrypted with the receiver authentication key, comprises:
   sending position information of the receiver authentication key in the identity authentication information obtained through the measurement and a preset shared key and auxiliary authentication information encrypted with the receiver authentication key.

11. The identity authentication method of claim 10, further comprising:
receiving encrypted information via a classic channel;
wherein the encrypted information is a variant of an auxiliary authentication information obtained by applying a preset policy to the auxiliary authentication information;
decrypting the received encrypted information in a manner corresponding to the preset policy; and
determining whether information obtained with the decryption is consistent with the variant of the auxiliary authentication information.

12. The identity authentication method of claim 11, wherein the preset policy comprises:
executing an encryption operation by using the local preset shared key; or
executing an encryption operation by using the corresponding sender authentication key.

13. An identity authentication method for a quantum key distribution process comprising:
receiving quantum state information including quantum states of an identity authentication bit string interleaved within a key bit string from a peer device, wherein the identity authentication bit string and the key bit string have different wavelengths;
distinguishing the identity authentication bit string from the key bit string based on the different wavelengths;
measuring the received quantum states using measurement bases in accordance with a preset basis vector selection rule to obtain identity authentication information through the measurement;
determining if the obtained identity authentication information corresponds with the preset basis vector selection rule; and
in response to the determination that the obtained identity information corresponds with the preset basis vector selection rule, selecting a receiver authentication key from the identity authentication information.

14. The identity authentication method claim 13, wherein the identity authentication bit string is interleaved within the key bit string at a random position.

15. The identity authentication method claim 13, wherein the identity authentication bit string has a random length.

16. The identity authentication method of claim 13, wherein the preset basis vector selection rule comprises selecting bases in accordance with positions of identity authentication bits in the quantum state information.

17. The identity authentication method of claim 16, wherein selecting the bases in accordance with the positions of the identity authentication bits in the quantum state information includes selecting a corresponding horizontal polarization basis, a corresponding vertical polarization basis, a corresponding left-handed polarization basis, or a corresponding right-handed polarization basis in accordance with different results of position information of each identity authentication bit in a quantum state information mod 4.

18. The identity authentication method of claim 13, further comprising:
if the identity authentication information obtained through measurement corresponds with the preset basis vector selection rule, selecting a receiver authentication key from the identity authentication information; and
sending position information of the receiver authentication key and a preset shared key encrypted with the receiver authentication key to the peer device.

19. The identity authentication method of claim 18, wherein selecting the receiver authentication key from the identity authentication information comprises:
taking the identity authentication information as the receiver authentication key; or
selecting bits in different positions randomly from the identity authentication information, and taking a bit string made up of the selected bits as the receiver authentication key.

20. The identity authentication method of claim 13, before receiving the quantum state information, further comprising:
receiving a quantum key agreement request from the peer device;
verifying the identity of the peer device according to the received account information;
ending the quantum key distribution process, if the verification fails; and
sending account information of a receiver to the peer device, if the verification succeeds.

21. The identity authentication method of claim 13, wherein measuring the received quantum states in the quantum state information using the measurement bases in accordance with the preset basis vector selection rule to obtain the identity authentication information through the measurement further comprises:
eliminating parts of the measured quantum states where no photon is detected to obtain the identity authentication information through the measurement.

22. An identity authentication device for a quantum key distribution process, the device comprising:
a quantum state receiving unit configured to receive quantum state information including quantum states of an identity authentication bit string interleaved within a key bit string from a peer device, wherein the identity authentication bit string and the key bit string have different wavelengths,
wherein the identity authentication device is further configured to:
measure the received quantum states in accordance with the different wavelengths and a preset basis vector selection rule to obtain identity authentication information through the measurement,
distinguish the identity authentication bit string from the key bit string based on the different wavelengths,
determine if the obtained identity authentication information corresponds with the preset basis vector selection rule, and
in response to the determination that the obtained identity information corresponds with the preset basis vector selection rule, select a receiver authentication key from the identity authentication information.

23. A non-transitory computer-readable storage medium that stores a set of instructions that is executable by at least one processor of a receiver device to cause the receiver device to perform an identity authentication method for a quantum key distribution process, the method comprising:
receiving from a sender device, quantum state information including quantum states of an identity authentication bit string and quantum states of a randomly generated key bit string by using different wavelengths, the identity authentication bit string being interleaved in the key bit string at a random position and with a random length;
measuring the received quantum states in quantum state information in accordance with different wavelengths and measurement bases selected according to a preset basis vector selection rule to obtain identity authentication information from a measurement of an identity authentication bit string;

determining whether the identity authentication information obtained through the measurement corresponds with the preset basis vector selection rule; and in response to the determination that the identity authentication information obtained through the measurement corresponds with the preset basis vector selection rule:
selecting a receiver authentication key from the identity authentication information;

sending, to the sender device, position information of the receiver authentication key in the identity authentication information obtained through the measurement and a preset shared key encrypted with the receiver authentication key, wherein the position information and the identity authentication bit string are used by the sender to select a corresponding sender authentication key and wherein the receiver authentication key is decrypted with a sender authentication key to obtain a new preset shared key; and ending the quantum key distribution process if the new preset shared key obtained by decrypting the receiver authentication key with the sender authentication key is not consistent with a local preset shared key.

24. The non-transitory computer-readable storage medium of claim 23, wherein the set of instructions that are executable by the at least one processor of the receiver device to cause the receiver device to further perform:
publicizing the measurement bases for measuring a key quantum state via a classic channel.

25. The non-transitory computer-readable storage medium of claim 23, wherein the set of instructions that are executable by the at least one processor of the receiver device to cause the receiver device to further perform:
performing identity verification by using preset account information via a classic channel before the sender sends the quantum state information of the identity authentication bit string and of the randomly generated key bit string.

26. The non-transitory computer-readable storage medium of claim 25, wherein the preset account information comprises identity information and a certificate.

27. The non-transitory computer-readable storage medium of claim 23, wherein the preset basis vector selection rule comprises:
selecting the preparation bases or the measurement bases in accordance with positions of identity authentication bits in the quantum state information.

28. The non-transitory computer-readable storage medium of claim 27, wherein selecting the corresponding preparation bases or the measurement bases in accordance with the positions of the identity authentication bits in the quantum state information includes:
selecting a corresponding horizontal polarization basis, a vertical polarization basis, a left-handed polarization basis or a right-handed polarization basis in accordance with different results of position information of each identity authentication bit in a quantum state information mod 4.

29. The non-transitory computer-readable storage medium of claim 23, wherein measuring the received quantum states in the quantum state information in accordance with the different wavelengths and the measurement bases selected according to the basis vector selection rule includes:

distinguishing identity authentication quantum state information and key quantum state information in accordance with the different wavelengths;
measuring the identity authentication quantum state information by using the selected measurement bases; and
eliminating parts of the selected measurement bases where no photon is detected to obtain the identity authentication information through the measurement.

30. The non-transitory computer-readable storage medium of claim 29, wherein the identity authentication information corresponds with the basis vector selection rule, if a difference between the identity authentication information measured by the receiver device and expected information is less than a preset threshold.

31. The non-transitory computer-readable storage medium of claim 23, wherein selecting the receiver authentication key from the identity authentication information includes:
taking the identity authentication information as the receiver authentication key; or
selecting bits in different positions randomly from the identity authentication information, and taking a bit string made up of the selected bits as the receiver authentication key.

32. The non-transitory computer-readable storage medium of claim 23, wherein sending position information of the receiver authentication key in the identity authentication information obtained through the measurement and the preset shared key encrypted with the receiver authentication key, comprises:
sending position information of the receiver authentication key in the identity authentication information obtained through the measurement and a preset shared key and auxiliary authentication information encrypted with the receiver authentication key.

33. The non-transitory computer-readable storage medium of claim 32, wherein the set of instructions that are executable by the at least one processor of the receiver device to cause the receiver device to further perform:
receiving via a classic channel encrypted information, wherein the encrypted information is a variant of an auxiliary authentication information obtained by applying a preset policy to the auxiliary authentication information;
decrypting the received encrypted information in a manner corresponding to the preset policy; and
determining whether information obtained with the decryption is consistent with the variant of the auxiliary authentication information.

34. The non-transitory computer-readable storage medium of claim 33, wherein the preset policy comprises:
executing an encryption operation by using the local preset shared key; or
executing an encryption operation by using the corresponding sender authentication key.

35. A non-transitory computer-readable storage medium that stores a set of instructions that is executable by at least one processor of a receiver device to cause the receiver device to perform an identity authentication method for a quantum key distribution process, the method comprising:
receiving quantum state information including quantum states of an identity authentication bit string interleaved within a key bit string from a peer device, wherein the identity authentication bit string and the key bit string have different wavelengths;
distinguishing the identity authentication bit string from the key bit string based on the different wavelengths;

measuring the received quantum states using measurement bases in accordance with a preset basis vector selection rule to obtain identity authentication information through the measurement; and determining if the obtained identify authentication information corresponds with the preset basis vector selection rule, and in response to the determination that the obtained identity information corresponds with the preset basis vector selection rule:

selecting a receiver authentication key from the identity authentication information.

36. The non-transitory computer-readable storage medium of claim 35, wherein the identity authentication bit string is interleaved within the key bit string at a random position.

37. The non-transitory computer-readable storage medium of claim 35, wherein the identity authentication bit string has a random length.

38. The non-transitory computer-readable storage medium of claim 35, wherein the preset basis vector selection rule comprises selecting bases in accordance with positions of identity authentication bits in the quantum state information.

39. The non-transitory computer-readable storage medium of claim 38, wherein selecting the bases in accordance with the positions of the identity authentication bits in the quantum state information includes selecting a corresponding horizontal polarization basis, a corresponding vertical polarization basis, a corresponding left-handed polarization basis, or a corresponding right-handed polarization basis in accordance with different results of position information of each identity authentication bit in a quantum state information mod 4.

40. The non-transitory computer-readable storage medium of claim 35, wherein the set of instructions that are executable by the at least one processor of the receiver device to cause the receiver device to further perform:

if the identity authentication information obtained through measurement corresponds with the preset basis vector selection rule, selecting a receiver authentication key from the identity authentication information; and sending position information of the receiver authentication key and a preset shared key encrypted with the receiver authentication key to the peer device.

41. The non-transitory computer-readable storage medium of claim 40, wherein selecting the receiver authentication key from the identity authentication information comprises:

taking the identity authentication information as the receiver authentication key; or selecting bits in different positions randomly from the identity authentication information, and taking a bit string made up of the selected bits as the receiver authentication key.

42. The non-transitory computer-readable storage medium of claim 35, before receiving the quantum state information, wherein the set of instructions that are executable by the at least one processor of the receiver device to cause the receiver device to further perform:

receiving a quantum key agreement request from the peer device;

verifying the identity of the peer device according to the received account information;

ending the quantum key distribution process, if the verification fails; and sending account information of a receiver to the peer device, if the verification succeeds.

43. The non-transitory computer-readable storage medium of claim 35, wherein measuring the received quantum states in the quantum state information using the measurement bases in accordance with the preset basis vector selection rule to obtain the identity authentication information through the measurement further comprises:

eliminating parts of the measured quantum states where no photon is detected to obtain the identity authentication information through the measurement.

* * * * *

UNITED STATES PATENT AND TRADEMARK OFFICE
CERTIFICATE OF CORRECTION

| | |
|---|---|
| PATENT NO. | : 10,038,554 B2 |
| APPLICATION NO. | : 15/017416 |
| DATED | : July 31, 2018 |
| INVENTOR(S) | : Yingfang Fu et al. |

Page 1 of 1

It is certified that error appears in the above-identified patent and that said Letters Patent is hereby corrected as shown below:

In the Claims

Claim 14, Column 23, Line 41, "authentication method claim 13," should read --authentication method of claim 13,--.

Claim 15, Column 23, Line 44, "authentication method claim 13," should read --authentication method of claim 13,--.

Signed and Sealed this
Second Day of October, 2018

Andrei Iancu
*Director of the United States Patent and Trademark Office*